United States Patent
Robbins

(10) Patent No.: US 9,319,530 B2
(45) Date of Patent: Apr. 19, 2016

(54) METHOD AND SYSTEM FOR PROVIDING TELEMETRY, VERIFICATION AND/OR OTHER ACCESS IN A SIP-BASED NETWORK

(75) Inventor: David C. Robbins, Grafton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/079,190

(22) Filed: Apr. 4, 2011

(65) Prior Publication Data

US 2011/0176449 A1    Jul. 21, 2011

Related U.S. Application Data

(63) Continuation of application No. 11/534,228, filed on Sep. 22, 2006, now Pat. No. 8,144,693.

(60) Provisional application No. 60/719,465, filed on Sep. 22, 2005.

(51) Int. Cl.
| | |
|---|---|
| H04L 12/66 | (2006.01) |
| H04M 7/00 | (2006.01) |
| H04L 29/06 | (2006.01) |
| H04M 11/04 | (2006.01) |
| H04M 1/27 | (2006.01) |

(52) U.S. Cl.
CPC .......... *H04M 7/006* (2013.01); *H04L 65/1006* (2013.01); *H04L 65/1069* (2013.01); *H04L 65/1076* (2013.01); *H04L 65/1096* (2013.01); *H04M 11/04* (2013.01); *H04M 1/27* (2013.01)

(58) Field of Classification Search
None
See application file for complete search history.

(56) References Cited

U.S. PATENT DOCUMENTS

| | | | |
|---|---|---|---|
| 3,737,587 | A | 6/1973 | Romero |
| 4,125,872 | A | 11/1978 | Maxwell |
| 4,154,987 | A | 5/1979 | Rosenberg et al. |
| 4,528,424 | A | 7/1985 | Middleton et al. |
| 4,723,271 | A | 2/1988 | Grundtisch |
| 4,741,024 | A | 4/1988 | Del Monte et al. |
| 4,950,011 | A | 8/1990 | Borcea et al. |
| 5,165,095 | A | 11/1992 | Borcherding |
| 5,255,314 | A | 10/1993 | Applegate et al. |

(Continued)

OTHER PUBLICATIONS

"AINGR: Switching Systems, (a module of AINGR, FR-15)," Telcordia Technologies Generic Requirements, GR-1298-CORE, Issue 6, 1226 pages, Nov. 1, 2000.

(Continued)

*Primary Examiner* — Steven H Nguyen

(57) ABSTRACT

A method and system of an embodiment of the present invention may involve receiving an invite message at a network port of a device to initiate a communication session with the device; identifying an address associated with the invite message; when the address corresponds to a first address, performing a first session initiation process to establish first communications via an audio port of the device; and when the address corresponds to a second address, performing a second session initiation process to establish second communications via the audio port of the device; wherein the second session initiation process differs from the first session initiation process. In addition, access to the audio port may involve determining a priority of the invite message; rejecting the invite message when the priority of the invite message is inferior relative to a priority of a current dialog; and accepting the invite message when the priority of the invite request is superior to the priority of the current dialog.

21 Claims, 7 Drawing Sheets

(56) References Cited

U.S. PATENT DOCUMENTS

| | | |
|---|---|---|
| 5,323,444 A | 6/1994 | Ertz et al. |
| 5,471,519 A | 11/1995 | Howe et al. |
| 5,475,745 A | 12/1995 | Boyle |
| 5,619,561 A | 4/1997 | Reese |
| 5,758,284 A | 5/1998 | Chavez, Jr. et al. |
| 5,815,550 A | 9/1998 | Miller |
| 5,835,570 A | 11/1998 | Wattenbarger |
| 5,913,166 A | 6/1999 | Buttitta et al. |
| 5,970,134 A | 10/1999 | Highland et al. |
| 5,999,610 A | 12/1999 | Lin et al. |
| 6,021,176 A | 2/2000 | McKendry et al. |
| 6,026,156 A | 2/2000 | Epler et al. |
| 6,031,896 A | 2/2000 | Gardell et al. |
| 6,072,865 A | 6/2000 | Haber et al. |
| 6,208,726 B1 | 3/2001 | Bansal et al. |
| 6,219,414 B1 | 4/2001 | Maciejewski et al. |
| 6,308,726 B2 | 10/2001 | Sato et al. |
| 6,337,898 B1 | 1/2002 | Gordon |
| 6,339,639 B1 | 1/2002 | Henderson |
| 6,404,876 B1 | 6/2002 | Smith et al. |
| 6,453,040 B1 | 9/2002 | Burke et al. |
| 6,484,196 B1 | 11/2002 | Maurille |
| 6,510,315 B1 | 1/2003 | Arnson |
| 6,636,594 B1 | 10/2003 | Oran |
| 6,735,295 B1 | 5/2004 | Brennan et al. |
| 6,741,695 B1 | 5/2004 | McConnell et al. |
| 6,744,877 B1 | 6/2004 | Edwards |
| 6,754,325 B1 | 6/2004 | Silver et al. |
| 6,801,604 B2 | 10/2004 | Maes et al. |
| 6,807,259 B1 | 10/2004 | Patel et al. |
| 6,826,174 B1 | 11/2004 | Erekson et al. |
| 6,834,048 B1 | 12/2004 | Cho et al. |
| 6,856,616 B1 | 2/2005 | Schuster et al. |
| 6,857,072 B1 | 2/2005 | Schuster et al. |
| 6,870,830 B1 | 3/2005 | Schuster et al. |
| 6,876,632 B1 | 4/2005 | Takeda |
| 6,879,673 B2 | 4/2005 | Creamer et al. |
| 6,954,521 B2 | 10/2005 | Bull et al. |
| 6,954,524 B2 | 10/2005 | Gibson |
| 6,961,332 B1 | 11/2005 | Li et al. |
| 6,963,633 B1 | 11/2005 | Diede et al. |
| 6,965,614 B1 * | 11/2005 | Osterhout et al. ............ 370/466 |
| 6,985,961 B1 * | 1/2006 | Ramsayer et al. ............ 709/238 |
| 6,996,605 B2 | 2/2006 | Low et al. |
| 7,020,130 B2 | 3/2006 | Krause et al. |
| 7,031,700 B1 | 4/2006 | Weaver et al. |
| 7,039,710 B2 * | 5/2006 | Khartabil ....................... 709/227 |
| 7,050,559 B2 | 5/2006 | Silver et al. |
| 7,082,193 B2 | 7/2006 | Barclay et al. |
| 7,085,253 B2 | 8/2006 | Yang |
| 7,123,707 B1 | 10/2006 | Hiri et al. |
| 7,130,282 B2 | 10/2006 | Black |
| 7,145,997 B2 | 12/2006 | Poikselka et al. |
| 7,203,293 B1 | 4/2007 | Bedingfield |
| 7,224,792 B2 | 5/2007 | Fusco |
| 7,257,837 B2 | 8/2007 | Xu et al. |
| 7,260,201 B2 | 8/2007 | Jorasch et al. |
| 7,274,662 B1 | 9/2007 | Kalmanek et al. |
| 7,283,517 B2 | 10/2007 | Yan et al. |
| 7,290,288 B2 | 10/2007 | Gregg et al. |
| 7,295,577 B2 | 11/2007 | Moody et al. |
| 7,301,913 B2 | 11/2007 | Corrao et al. |
| 7,406,696 B2 | 7/2008 | Burger et al. |
| 7,426,265 B2 | 9/2008 | Chen et al. |
| 7,440,440 B1 | 10/2008 | Abichandani et al. |
| 7,460,657 B1 | 12/2008 | Baeza |
| 7,489,771 B2 | 2/2009 | McMurry et al. |
| 7,564,846 B2 | 7/2009 | Dezonno et al. |
| 7,580,497 B2 | 8/2009 | Wang et al. |
| 7,587,031 B1 | 9/2009 | Ress et al. |
| 7,593,389 B2 | 9/2009 | Vance |
| 7,599,355 B2 | 10/2009 | Sunstrum |
| 7,602,901 B1 | 10/2009 | Kates et al. |
| 7,609,700 B1 | 10/2009 | Ying et al. |
| 7,609,706 B2 | 10/2009 | Scott et al. |
| 7,630,481 B2 | 12/2009 | Kafka |
| 7,711,810 B2 | 5/2010 | McKinnon et al. |
| 7,715,413 B2 | 5/2010 | Vaziri et al. |
| 7,743,141 B2 | 6/2010 | Wang et al. |
| 7,751,536 B1 | 7/2010 | Abramson et al. |
| 7,773,581 B2 | 8/2010 | Punj et al. |
| 7,813,490 B2 | 10/2010 | DeMent et al. |
| 7,849,205 B2 | 12/2010 | Pounds et al. |
| 7,860,089 B2 | 12/2010 | Tripathi et al. |
| 8,036,360 B1 | 10/2011 | Gogineni et al. |
| 8,059,805 B2 | 11/2011 | Claudatos et al. |
| 8,116,302 B1 | 2/2012 | Robbins |
| 8,379,824 B2 | 2/2013 | Jackson et al. |
| 2002/0038388 A1 | 3/2002 | Netter |
| 2002/0075305 A1 | 6/2002 | Beaton et al. |
| 2002/0114318 A1 | 8/2002 | Rines |
| 2002/0131447 A1 | 9/2002 | Krishnamurthy et al. |
| 2002/0136359 A1 | 9/2002 | Stumer et al. |
| 2002/0136363 A1 | 9/2002 | Stumer et al. |
| 2002/0137495 A1 | 9/2002 | Gabrysch |
| 2002/0141548 A1 | 10/2002 | Boda |
| 2002/0156900 A1 * | 10/2002 | Marquette et al. ............ 709/227 |
| 2003/0007483 A1 | 1/2003 | Um |
| 2003/0028806 A1 | 2/2003 | Govindarajan et al. |
| 2003/0043992 A1 | 3/2003 | Wengrovitz |
| 2003/0088421 A1 | 5/2003 | Maes et al. |
| 2003/0231759 A1 | 12/2003 | Bedingfield, Sr. et al. |
| 2004/0004942 A1 | 1/2004 | Nebiker et al. |
| 2004/0030750 A1 | 2/2004 | Moore et al. |
| 2004/0037403 A1 | 2/2004 | Koch |
| 2004/0051900 A1 | 3/2004 | Sagiya et al. |
| 2004/0082324 A1 | 4/2004 | Ayoub |
| 2004/0090954 A1 | 5/2004 | Zhang et al. |
| 2004/0148395 A1 | 7/2004 | Schulzrinne |
| 2004/0174983 A1 | 9/2004 | Olschwang et al. |
| 2004/0207724 A1 | 10/2004 | Crouch et al. |
| 2004/0240650 A1 | 12/2004 | Bear et al. |
| 2004/0240656 A1 | 12/2004 | Poustchi |
| 2004/0243680 A1 * | 12/2004 | Mayer .......................... 709/206 |
| 2004/0249951 A1 | 12/2004 | Grabelsky et al. |
| 2004/0264406 A1 | 12/2004 | Pattenden et al. |
| 2005/0013421 A1 | 1/2005 | Chavez et al. |
| 2005/0043014 A1 | 2/2005 | Hodge |
| 2005/0069104 A1 | 3/2005 | Hanson et al. |
| 2005/0078642 A1 | 4/2005 | Mayer et al. |
| 2005/0123104 A1 | 6/2005 | Bishop et al. |
| 2005/0129219 A1 | 6/2005 | Williamson |
| 2005/0147227 A1 | 7/2005 | Chervirala et al. |
| 2005/0190721 A1 | 9/2005 | Pershan |
| 2005/0193338 A1 | 9/2005 | Hawkins et al. |
| 2005/0195802 A1 | 9/2005 | Klein et al. |
| 2005/0201530 A1 | 9/2005 | Koch et al. |
| 2005/0213716 A1 | 9/2005 | Zhu et al. |
| 2005/0215243 A1 | 9/2005 | Black et al. |
| 2005/0226217 A1 | 10/2005 | Logemann et al. |
| 2005/0237978 A1 | 10/2005 | Segal |
| 2005/0249196 A1 | 11/2005 | Ansari et al. |
| 2005/0286466 A1 | 12/2005 | Tagg et al. |
| 2006/0023658 A1 | 2/2006 | Phillips et al. |
| 2006/0033809 A1 | 2/2006 | Farley |
| 2006/0039389 A1 | 2/2006 | Burger et al. |
| 2006/0050648 A1 | 3/2006 | Eydelman |
| 2006/0050682 A1 | 3/2006 | Vance |
| 2006/0062210 A1 | 3/2006 | Dharanikota |
| 2006/0062251 A1 | 3/2006 | Lim et al. |
| 2006/0067300 A1 | 3/2006 | Poustchi et al. |
| 2006/0067504 A1 | 3/2006 | Goldman et al. |
| 2006/0140379 A1 | 6/2006 | Yamamoto et al. |
| 2006/0140380 A1 | 6/2006 | Croak et al. |
| 2006/0146737 A1 | 7/2006 | Sandgren et al. |
| 2006/0153342 A1 | 7/2006 | Sasaki |
| 2006/0165060 A1 * | 7/2006 | Dua ............................. 370/352 |
| 2006/0177030 A1 | 8/2006 | Rajagopalan et al. |
| 2006/0177044 A1 | 8/2006 | O'Neil et al. |
| 2006/0178130 A1 | 8/2006 | Makrygiannis |
| 2006/0203986 A1 | 9/2006 | Gibson |
| 2006/0218283 A1 | 9/2006 | Jones et al. |
| 2006/0221176 A1 | 10/2006 | Di Pietro et al. |
| 2006/0251229 A1 | 11/2006 | Gorti et al. |

(56) References Cited

U.S. PATENT DOCUMENTS

| | | |
|---|---|---|
| 2006/0268750 A1 | 11/2006 | Weiner |
| 2006/0285533 A1 | 12/2006 | Divine et al. |
| 2006/0286984 A1 | 12/2006 | Bonner |
| 2007/0025270 A1 | 2/2007 | Sylvain |
| 2007/0058613 A1 | 3/2007 | Beckemeyer |
| 2007/0058637 A1 | 3/2007 | Lo |
| 2007/0083658 A1 | 4/2007 | Hanna et al. |
| 2007/0092073 A1 | 4/2007 | Olshansky et al. |
| 2007/0111723 A1 | 5/2007 | Ahmed et al. |
| 2007/0127660 A1 | 6/2007 | Roberts et al. |
| 2007/0143858 A1 | 6/2007 | Hearty |
| 2007/0147601 A1 | 6/2007 | Tischer et al. |
| 2007/0280469 A1 | 12/2007 | Baker et al. |
| 2008/0049724 A1 | 2/2008 | Tsujino et al. |
| 2008/0126549 A1 | 5/2008 | Khanchandani et al. |
| 2009/0021574 A1* | 1/2009 | Iwami ........................ 348/14.04 |

OTHER PUBLICATIONS

"Cisco CallManager Features and Services Guide, Release 4.1(3)—Multilevel Precedence and Preemption," Cisco Systems, Inc., http://www.cisco.com/en/US/products/sw/voicesw/ps556/products_administration_guide . . . , three pages, Copyright 2005.

"IP Office, Do Not Disturb," Carroll Communications, Inc., www.carrollcommunications.com/ipoffice/5donotdisturb.html, one page, Copyright 2008.

"LSSGR Guide, (A Module of LSSGR, FR-64)," Telcordia Technologies Special Report, SR-3065, Issue 7, 114 pages, Aug. 1, 2003.

"Newton's Telecom Dictionary, 22nd Edition," CMP Books, three pages, Feb. 2006.

"SPCS Capabilities and Features, A Module of LSSGR, FR-64," Telcordia Technologies Special Report, SR-504, Issue 1, 212 pages, Mar. 1, 1996.

Handley, et al., "SDP: Session Description Protocol, RFC 2327," Network Working Group, The Internet Society, 43 pages, Apr. 1998.

Harrington, et al., "An Architecture for Describing Simple Network Management Protocol (SNMP) Management Frameworks, RFC 3411," Network Working Group, The Internet Society, pp. 1-64, Dec. 1, 2002.

Jennings, et al., "Private Extensions to the Session Initiation Protocol (SIP) for Asserted Identity within Trusted Networks, RFC 3325," Network Working Group, The Internet Society, pp. 1-18, Nov. 1, 2002.

Johnston, et al., "Session Initiation Protocol Call Control, Conferencing for User Agents, draft-ietf-sipping-cc-conferencing-04," SIPPING Working Group, The Internet Society, pp. 1-39, Jul. 18, 2004.

Lingle, et al., "Management Information Base for Session Initiation Protocol (SIP), draft-ietf-sip-mib-08.txt," SIPPING Working Group, The Internet Society, 102 pages, Jul. 16, 2004.

Mahy, et al., "A Call Control and Multi-Party Usage Framework for the Session Initiation Protocol (SIP), draft-ietf-sipping-cc-framework-03.txt," SIPPING Working Group, The Internet Society, pp. 1-43, Oct. 27, 2003.

Mahy, "A Message Summary and Message Waiting Indication Event Package for the Session Initiation Protocol (SIP), RFC 3842," Cisco Systems, Inc., Network Working Group, The Internet Society, pp. 1-19, Aug. 1, 2004.

Mahy, et al., "The Session Initiation Protocol (SIP) 'Join' Header, draft-ietf-sip-join-03.txt.," SIPPING Working Group, The Internet Society, pp. 1-20, Feb. 16, 2004.

Mahy et al, "The Session Initiation Protocol (SIP) 'Join' Header, RFC 3911," Network Working Group, The Internet Society, pp. 1-17, Oct. 2004.

Mahy, et al., "The Session Initiation Protocol (SIP) 'Replaces' Header, draft-ietf-sip-replaces-05.txt.," SIPPING Working Group, The Internet Society, pp. 1-19, Feb. 16, 2004.

Mahy, et al., "The Session Initiation Protocol (SIP) 'Replaces' Header, RFC 3891," Network Working Group, The Internet Society, pp. 1-16, Sep. 1, 2004.

Petrie, "A Framework for Session Initiation Protocol User Agent Profile Delivery, draft-ietf-sipping-config-framework-04.txt," Pingtel Corp., SIPPING Working Group, The Internet Society, 34 pages, Jul. 19, 2004.

Rosenberg, et al., "A Session Initiation Protocol (SIP) Event Package for Conference State, draft-ietf-sipping-conference-package-04," SIPPING Working Group, The Internet Society, 29 pages, May 21, 2004.

Rosenberg, et al., "An Invite Initiated Dialog Event Package for the Session Initiation Protocol (SIP), draft-ietf-sipping-dialog-package-04.txt," SIPPING Working Group, The Internet Society, pp. 1-35, Feb. 13, 2004.

Rosenberg, et al., "Indicating User Agent Capabilities in the Session Initiation Protocol (SIP), RFC 3840," Network Working Group, The Internet Society, pp. 1-35, Aug. 1, 2004.

Rosenberg, et al., "Reliability of Provisional Responses in the Session Initiation Protocol (SIP), RFC 3262," Network Working Group, The Internet Society, pp. 1-14, Jun. 2002.

Rosenberg, et al., "SIP: Session Initiation Protocol, RFC 3261," Network Working Group, The Internet Society, 252 pages, Jun. 2002.

Rosenberg, "The Session Initiation Protocol (SIP) Update Method, RFC 3311," Dynamicsoft Inc., Network Working Group, The Internet Society, pp. 1-13, Sep. 1, 2002.

Schulzrinne, "Emergency Services URI for the Session Initiation Protocol, draft-ietf-sipping-sos-00," Columbia University, Network Working Group, The Internet Society, pp. 1-17, Feb. 8, 2004.

Schulzrinne, et al., "RTP Payload for DTMF Digits, Telephony Tones and Telephony Signals, RFC 2833," Network Working Group, The Internet Society, 31 page, May 2000.

Schulzrinne, et al., "RTP: A Transport Protocol for Real-Time Applications, RFC 1889," Network Working Group, The Internet Society, pp. 1-75, Jan. 1996.

Sparks, et al., "Session Initiation Protocol Call Control—Transfer, draft-ietf-sipping-cc-transfer-02," SIPPING Working Group, The Internet Society, pp. 1-37, Feb. 15, 2004.

Sparks, "The Session Initiation Protocol (SIP) Refer Method, RFC 3515," Dynamicsoft, Inc., Network Working Group, The Internet Society, pp. 1-23, Apr. 2003.

* cited by examiner

METHOD AND SYSTEM FOR PROVIDING TELEMETRY, VERIFICATION AND/OR OTHER ACCESS IN A SIP-BASED NETWORK

CROSS-REFERENCE TO RELATED APPLICATIONS

This patent application is a continuation of U.S. patent application Ser. No. 11/534,228, filed Sep. 22, 2006, entitled "Method and System for Providing Telemetry, Verification and/or Other Access in a SIP-Based Network" to David C. Robbins, which claims priority to U.S. Provisional Patent Application No. 60/719,465, filed Sep. 22, 2005. The disclosures of these priority applications are hereby incorporated by reference herein in their entireties.

BACKGROUND INFORMATION

Session Initiation Protocol (SIP) is a call control signaling protocol for Internet Protocol (IP) networks. SIP is designed to be device-agnostic—that is, it is intended to provide a highly flexible call signaling capability that is not tailored to the capabilities of any particular device. Analog telephone signaling, on the other hand, is device-specific and highly constrained because of the historical legacy of the services delivered to the device. As a result, many call features available in traditional analog telephone devices are not easily integrated in a SIP-based network.

BRIEF DESCRIPTION OF THE DRAWINGS

In order to facilitate a fuller understanding of the exemplary embodiments of the present inventions, reference is now made to the appended drawings. These drawings should not be construed as limiting, but are intended to be exemplary only.

DETAILED DESCRIPTION OF PREFERRED EMBODIMENTS

A system and process of an exemplary embodiment of the present invention provides the ability to recognize distinct contact addresses and invoke specific behavior based on the distinct contact addresses and further interact with normal voice calls.

Figure 1:
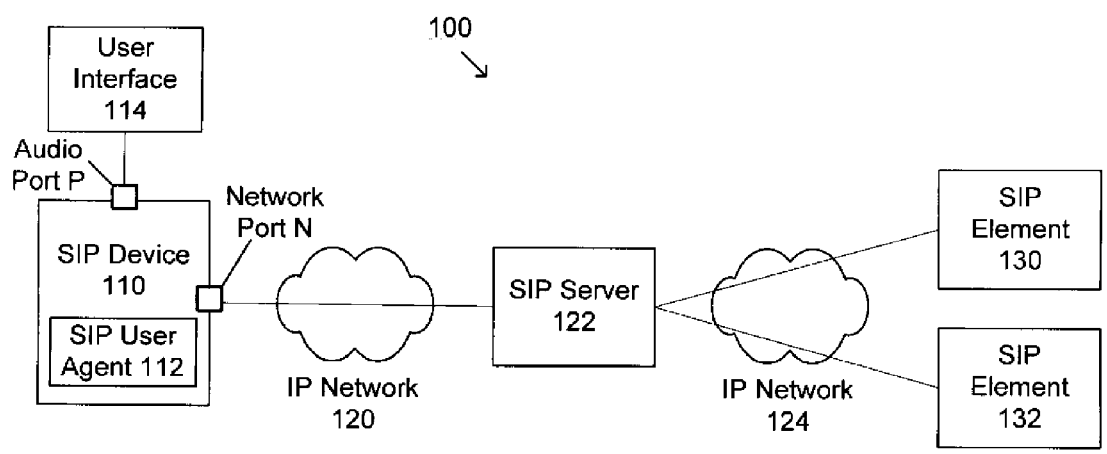
FIG. 1 is an exemplary SIP-based network system, according to an embodiment of the present invention.

FIG. 1 is an exemplary SIP-based network system, according to an embodiment of the present invention. System 100 illustrates an exemplary system for supporting SIP communication, in particular providing access to a SIP device based on a contact address associated with an invite request. As illustrated, SIP Device 110 may be coupled to User Interface 114. SIP Device 110 may include a SIP User Agent 112 for communicating across IP Network 120 to a SIP Server 122. SIP Server 122 may provide communication to other SIP devices, as shown by SIP Element 130 and SIP element 132, through IP Network 124. The various components of system 100 may be further duplicated, combined and/or integrated to support various applications and platforms. Additional elements may also be implemented in the system to support various applications. A SIP-based network may also include an IP network, packet switched based network or other type of network. The elements referred to in the Figures may include other network or packet switched based elements. For example, the elements referred to as "SIP" may include other network devices, elements, components, etc.

SIP Device 110 may represent a device that manages User Interface 114. User Interface 114 may include a traditional telephone and other data communication device using voice-band or other signaling, including but not limited to data modems, facsimile devices, teletype (TTY) equipment, etc. SIP Device 110 may contain SIP User Agent 112. SIP User Agent 112 may be integrated with SIP Device 110 or remote from SIP Device 110. SIP User Agent 112 may perform interworking between SIP signaling and user interface actions. For example, SIP User Agent 112 may manage an exchange of media (e.g., audio, etc.) between User Interface 114 and a Real Time Protocol (RTP) media stream of a media session set up by the SIP signaling. SIP Device 110 may originate calls to and receive calls from other users. SIP Device 110 may communicate through IP Network 120 to SIP Server 122. In addition, SIP Device 110 may include a Network Port N for communicating through IP Network 120 and an Audio Port P for communication with User Interface 114.

SIP Server 122 may represent a SIP proxy or application server that acts on behalf of SIP Device 110. For example, SIP Server 122 may manage a SIP Address of Record (AOR) on behalf of SIP Device 110. SIP Device 110 may register with SIP Server 122 and send SIP signaling through SIP Server 122 to other SIP elements, such as SIP Element 130 and SIP Element 132. For example, a call to the SIP AOR may be delivered to SIP Server 122, which in turn delivers the call to SIP Device 110. SIP Server 122 may perform some service on behalf of SIP Device 110, or may simply forward SIP messages to and from SIP Device 110. SIP Device 110 communicates through IP Network 124 to SIP Element 130 and/or SIP Element 132.

SIP Element 130 and SIP Element 132 may represent users with which the user of SIP Device 110 communicates. SIP Element may be a SIP Device, SIP Server, and/or other SIP enabled device. In addition, SIP Element may also represent a PSTN device that may be reached by a gateway that, directly or indirectly, acts as a SIP User Agent.

According to an embodiment of the present invention, SIP Device 110 may recognize various distinct contact addresses and provide corresponding distinct modes of access to Audio Port P. Access may include normal voice calling, verification access, test access, telemetry access and/or other access. In addition, priority rules may be implemented to grant access based on relative priorities determinations when a request is received during an established dialog.

Figure 2:
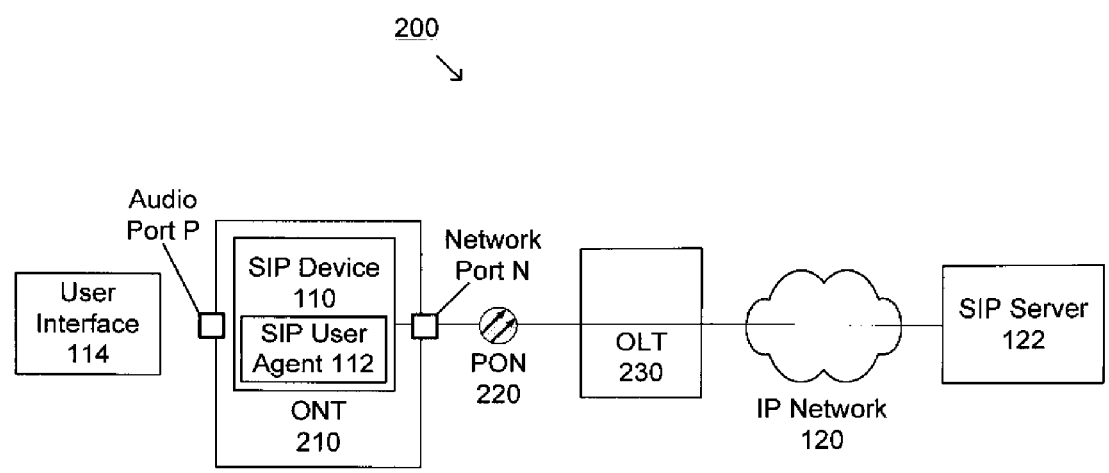
FIG. 2 illustrates an exemplary implementation where a SIP Device is embedded in a FTTP network, according to an embodiment of the present invention.
Figure 3:
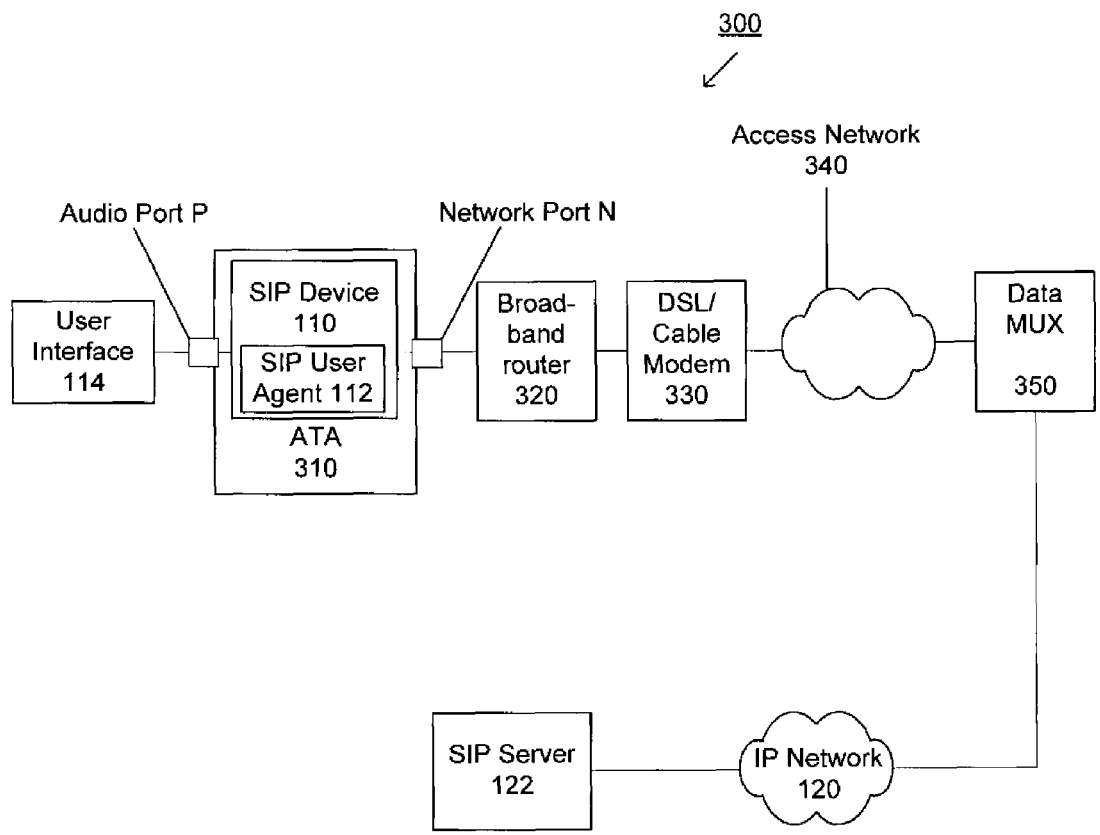
FIG. 3 illustrates an exemplary implementation where a SIP Device is embedded in an ATA device connected to an IP network, according to an embodiment of the present invention.

FIGS. 2 and 3 show exemplary implementations of a SIP Device. FIG. 2 illustrates an exemplary implementation where a SIP Device is used in connection with a Fiber-to-the-Premises (MP) network, according to an embodiment of the present invention. FIG. 3 illustrates an exemplary implementation where a SIP Device is embedded in an Analog Telephone Adapter (ATA) which is used in connection with a traditional (e.g., electrical) IP-enabled access network, according to an embodiment of the present invention. Other implementations with other devices and/or networks may also be realized.

As shown in FIG. 2, User Interface 114 may be connected to SIP Device 110. SIP Device 110 may be embedded in Optical Network Terminal (ONT) 210 or otherwise integrated. ONT 210 may be connected to an Optical Line Terminal (OLT) 230 via a Passive Optical Network (PON) 220 acting as an access network for communications between ONTs 210 and OLTs 230. According to an exemplary application, OLT 230 may be located at a Central Office. ONT 210 may be connected over PON 220 to the OLT 230, which in turn passes that connection through transport IP network 120 to SIP Server 122. According to an exemplary application, OLT 230 may maintain an IP connection between SIP Device 110 on the ONT 210 and the transport IP network 120. In this exemplary application, the OLT 230 may not process SIP signaling, but rather allows SIP signaling to pass through to its destination.

FIG. 3 illustrates SIP Device 110 embedded in an Analog Telephone Adapter (ATA) 310 in a home or other location that subscribes to a broadband service delivered via an access network, such as DSL or cable modem service. The ATA device may be attached to a network, such as a broadband data network, IP network and/or other network. User Interface 114 may be connected to SIP Device 110. ATA 310 may be connected to Broadband Router 320, which in turn may be connected to a DSL or cable modem 330, which in turn may be connected to access network 340. Access network 340 may provide connectivity to transport IP network 120 through which the SIP Device 110 may communicate with SIP Server 122. In one example, as shown in FIG. 3, data multiplexer (MUX) 350 may provide a point of connection for transmissions between access network 340 and the transport IP network 120.

The various components of systems 200 and 300 as shown in FIGS. 2 and 3 may be further duplicated, combined and/or integrated to support various applications and platforms. Additional elements may also be implemented in the systems described above to support various applications.

In an Internet Protocol (IP) network using the Session Initiation Protocol (SIP) for voice call control signaling, it may be desired to provide the equivalent of test, verification, and telemetry access to an analog telephone line (or equivalent) managed by a SIP User Agent. Such access may involve exchange of audio signals with the line, without normal call control signaling (e.g., power ringing, loop closure, etc.). An embodiment of the present invention provides a method and system for using SIP signaling to provide such access. Instead of relying upon protocols other than SIP, or on non-standard SIP extensions, an embodiment of the present invention may involve a SIP User Agent recognizing distinct contact addresses as having certain properties that invoke behavior appropriate for test, verification, telemetry and/or other access to an analog line. Further, an embodiment of the present invention minimizes and/or eliminates undesirable interactions with normal voice calls.

In the public switched telephone network (PSTN), an analog line that is normally used for originating and receiving voiceband telephone calls may at times also be accessed from the network for alternate purposes other than handling calls. Such alternative purposes may include test access, telemetry, busy line verification and/or other purposes. Test access may involve providing a connection from a test trunk to a subscriber line, for various manual and/or automatic testing purposes. Telemetry access may involve providing a connection to a telemetry device that shares a subscriber line (e.g., remote meter reading, etc.). Busy line verification access may involve providing a connection from a verification operator to a subscriber line for the purpose of determining whether there is conversation on a busy line or other activity. In addition, busy verification access may provide the ability for the operator to break into a call. These functions may be provided by a central office switch to loop-start analog lines.

The PSTN is evolving from its legacy technology base of analog and time-division multiplex (TDM) transport and signaling to a technology base using Internet Protocol (IP) transport and signaling protocols. However, the IP-based network will continue to support legacy analog subscriber equipment (e.g., analog phones, faxes, modems). A mechanism for supporting analog equipment in the IP network may include a line media gateway deployed at the "edge" of the network, which uses IP signaling protocols that may be designed specifically for the gateway application. Gateway signaling protocols may operate at a relatively low level, and may thus easily support the functions of test access, busy line verification, telemetry and/or other alternate purposes with respect to analog subscriber equipment.

As IP signaling reaches more edge devices, SIP may be implemented as a call control signaling protocol for analog subscriber devices. For example, SIP signaling may meet analog subscriber equipment at devices such as Integrated Access Devices, Analog Telephone Adapters, and Optical Network Terminals. Such devices may manage one or more connections to analog devices, and may contain SIP User Agents that perform the translation between the analog line signaling expected by such analog devices and SIP protocol messages. In addition, SIP may also replace gateway control protocols in line media gateways. In contrast with gateway control protocols, which may be described as device control protocols, SIP may be considered a relatively high-level call control protocol.

As SIP is generally independent of the particular device used to originate and receive a call, SIP is typically not designed to provide direct access to an audio port of an edge device (e.g., the analog line) for purposes such as testing, busy line verification, or telemetry. An embodiment of the present invention provides audio port access for alternate purposes using standard SIP signaling.

An embodiment of the present invention may involve a device with a port to an analog user interface and a port to a network. The device may include SIP Device 110 which may include SIP User Agent 112, as shown in FIG. 1. A first port, as shown by Audio Port P, may be connected to one or more analog user interfaces, such as User Interface 114. For example, User Interface 114 may include telephones or other communication devices, through which a user originates and receives calls as well as perform other form of communication. In addition, Audio Port P may also connect to one or more devices that may not be typically used to originate or receive calls, but may communicate using voiceband and/or other signaling to perform various functions, such as test, verification, telemetry, etc. A second port, as shown by Network Port N, may be connected to network 120, which may include intermediate nodes (e.g., routers, switches, etc.). Network Port N may permit communication with a remote SIP element over network 120. The remote SIP element may in fact be a point of connection to a network composed of many elements. For example, the remote SIP element may include a SIP Server 122, a proxy server, an application server, a User Agent and/or other devices, including a SIP enabled device and/or other network enabled device. The remote SIP element may originate calls to and receive calls from SIP Device 110 using SIP signaling, such as described below. Using the method described in accordance with the various embodiments of the present inventions and embodied in SIP User Agent 112 in SIP Device 110, the remote SIP element may also obtain access to Audio Port P for various purposes including testing, busy line verification, telemetry and/or other purposes.

SIP Device 110 may contain more than one Audio Port P, each such port capable of supporting at least one associated User Interface 114. While the description and Figures illustrate a single audio port, additional audio ports, devices and/or components may be implemented. In addition, an Audio Port P may communicate with additional devices, such as multiple user agents, if such a configuration is desired. Further, the various elements may be further integrated, combined and/or separated across multiple components. Other architectures and scenarios may be implemented.

According to an exemplary scenario associated with a typical voice communication session, a remote SIP element may originate a call or other communication session to SIP Device 110. The process may begin with a SIP INVITE message sent from the remote SIP element to SIP User Agent 112 in SIP Device 110. The SIP INVITE message may be received by SIP Server 122 with which the SIP Device 110 has registered. The SIP Server 122 may perform address mapping and/or some admission control actions and forward the SIP INVITE to SIP Device 110. Upon receiving the INVITE message, SIP User Agent 112 may alert the user by some form of signaling transmitted through Audio Port P to one or more user interfaces connected to Audio Port P, which may include an attached communication device. When alerting begins, SIP User Agent 112 may send a "180 Ringing" message to the remote SIP element. The user may respond by performing an action such as picking up a handset or other acknowledgement. The action may then cause the user interface to transmit a signal through Audio Port P to SIP User Agent 112. In response, SIP User Agent 112 may send a "200 OK" message to the remote SIP element. The remote SIP element may then send an acknowledgement, e.g., ACK message, to SIP User Agent 112. During the INVITE/200 OK/ACK exchange with SIP User Agent 112, the remote SIP element may agree on audio session parameters. Upon reaching an agreement, the remote SIP element may exchange audio (or other data) between the device(s) attached to Audio Port P and an equivalent device at the remote SIP element. SIP User Agent 112 may track the state of the resulting call session. Eventually, one party may end the call by taking an action that results in a BYE message being sent. The element receiving the BYE message may respond with a "200 OK" message. A call originated by SIP Device 110 may begin with the user performing an initiation action, such as picking up a handset and dialing a number, whereupon SIP User Agent 112 in SIP Device 110 sends an INVITE message to SIP element. The call proceeds as described above, with SIP element and SIP Device 110 swapping roles.

The SIP User Agent 112 may manage more than one dialog simultaneously on behalf of Audio Port P. If multiple dialogs exist, some may be "on hold" and others may be "active." If more than one dialog is active, the audio for the dialogs may be mixed, thereby forming a conference. Audio Port P may support a single audio stream or multiple audio streams which may be switched from one dialog or a set of dialogs to another dialog or another set of dialogs. Accordingly, in SIP Device 110, Audio Port P may have no dialogs, one dialog or more multiple voice dialogs at any given time.

As noted above, a SIP dialog initiated by a SIP INVITE may correspond to a call and/or other form of communication between and/or among SIP devices and/or other communication devices. In the preferred embodiments described herein, a SIP dialog may not only include a typical voice dialog, but also a test dialog, a verification dialog, a telemetry dialog and/or other one-way or multiple-way communication of data specific to user interface equipment. In the preferred embodiment, SIP User Agent 112 may register a contact address with a "registrar" function in a SIP element (e.g., SIP Server 122). The contact address represents a unique address to which normal calls may be delivered. SIP User Agent 112 may also register alternate contact addresses associated with functionality supported by SIP Device 110 for interfacing with Audio Port P. For example, SIP User Agent 112 may register with its associated SIP Server 122 an address "A" which it may use for voice calling, an address "T" which it may use for telemetry sessions, and an address "V" which it may use for test/verification sessions. SIP User Agent 112 will interpret SIP INVITE messages directed to these addresses as requests for the special sessions that require alternate treatment, as further described below. Other addresses may also be used to represent other access, purpose or function, if such are provided by SIP Device 110.

According to an exemplary application, test, verification, and telemetry access may be initiated by a remote SIP element and directed to the appropriate alternate SIP address associated with the SIP Device 110. Upon receipt of the SIP INVITE directed to the alternate SIP address, SIP User Agent 112 may initiate an alternative session establishment process which accommodates the unique functionality of the requested service. For example, a test, telemetry or verification dialog may utilize means other than the usual and customary means for alerting and/or answering at analog devices connected to the Audio Port P of the SIP Device 110. For example, the dialog may be established without providing a "ringing" signal to the user interface device—which may allow a telemetry device (or other device) attached to the Audio Port P to "answer" and communicate data. In addition, a test, telemetry or verification dialog may have a priority relationship with respect to other dialogs, such that it may be rejected in favor of other dialogs, and may also preempt or be preempted by other dialogs. Further, a test, telemetry or verification dialog may join with another dialog that is active, or may become active, at the audio port of the device. Other types of dialog may be established in accordance with the various embodiments of the present invention.

The preferred embodiments described herein may thus provide access to the audio ports of a SIP Device 110 via a SIP-established session, which may occur without disrupting the normal calling activities of the user and may accommodate the specific requirements of analog subscriber equipment.

Figure 4:
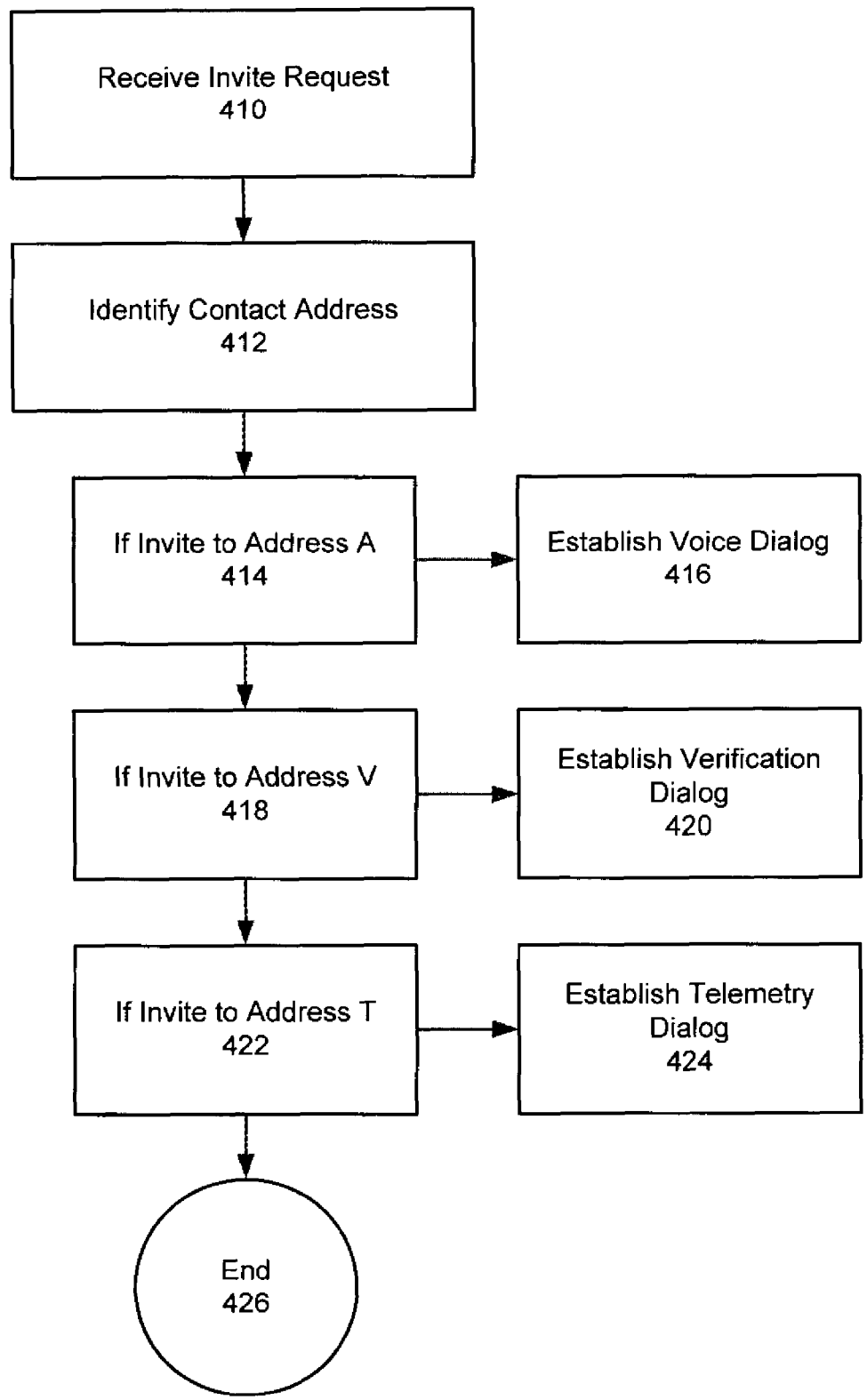
FIG. 4 is an exemplary flowchart illustrating a method for determining access to an audio port based on contact addresses, according to an embodiment of the present invention.

FIG. 4 is an exemplary flowchart illustrating a method for determining access to an audio port based on contact addresses, according to an embodiment of the present invention. At step 410, an INVITE request may be received at a device, such as a SIP User Agent 112 in SIP Device 110. The INVITE request may be specific to a particular contact address. The contact address may include an address or any other identifier. At step 412, a corresponding service supported by the SIP Device 110 may be identified for the contact address in the received INVITE request. For example, an INVITE to address "A" may be recognized as a request for a voice dialog at step 414. As a result, a voice dialog may be established as shown by step 416, in a manner that is well known. An INVITE to address "V" may be recognized as request for a verification dialog at step 418 and a verification dialog may be established as shown by step 420 (further described below). An INVITE to address "T" may be recognized as a request for a telemetry dialog at step 422 and a telemetry dialog may be established at step 424 (further described below). In addition, an embodiment of the present invention may receive INVITE messages to other addresses which may correspond to other services available on SIP Device 110 that have special processing requirements and/or provide other access. Step 426 represents an end of the process.

According to an embodiment of the present invention, priority rules may be implemented. The priority rules may apply when a request to establish a new dialog is received while a dialog is currently established. The existing dialog may be active, on hold or other status. For example, test and verification access to Audio Port P may involve connecting to an audio stream at Audio Port P regardless of the number of voice dialogs associated with Audio Port P. If no voice dialog is currently associated with Audio Port P, the test/verification audio stream may be a bidirectional exchange of audio with Audio Port P. If a voice dialog exists, then the test/verification audio stream may be mixed with the audio stream that exists between Audio Port P and a far end of the dialog. According to another example, telemetry access may involve a bidirectional exchange of audio with Audio Port P, making telemetry access to Audio Port P mutually exclusive with voice dialogs. Priority rules may arbitrate establishment of voice and telemetry dialogs in such cases. Other priority rules and/or conditions may also be applied.

Figure 5:
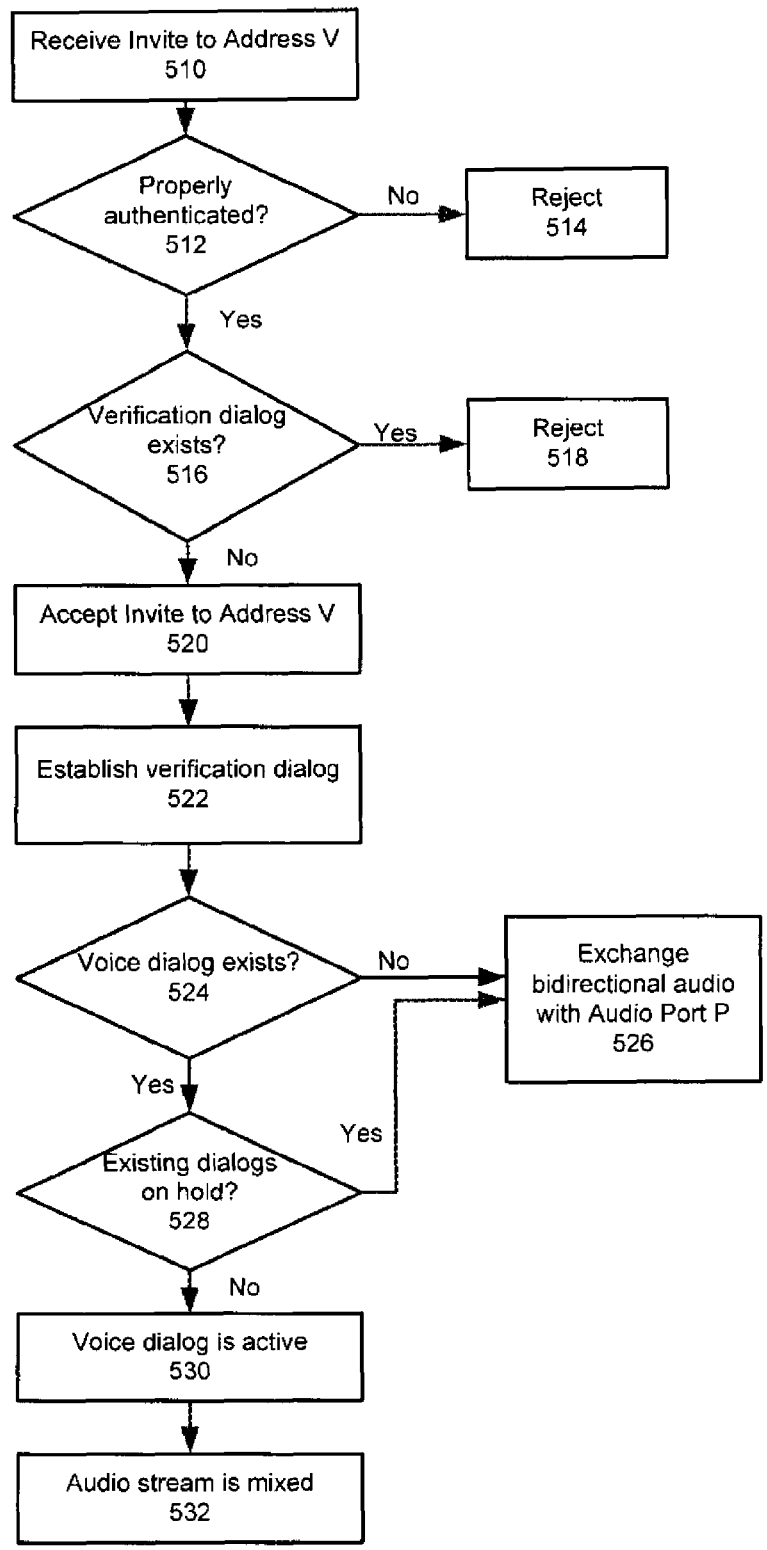
FIG. 5 is an exemplary flowchart illustrating a test and/or verification process, according to an embodiment of the present invention.

FIG. 5 is an exemplary flowchart illustrating a test and/or verification process, according to an embodiment of the present invention. At step 510, an INVITE to address V may be received. The INVITE to address V may be transmitted from a remote SIP element and received by a SIP User Agent in a SIP device which, for example, has registered address V as an address at which test/verification sessions with the Audio Port P associated with the SIP user Agent may be directed. It may be determined whether the INVITE to address V is properly authenticated, at step 512. If it is not properly authenticated, the INVITE to address V may be rejected, at step 514. At step 516, it may be determined whether a verification dialog already exists associated with Audio Port P. If so, the INVITE may be rejected. In addition, other determinations may be made and the INVITE may be rejected for other reasons.

If a verification dialog does not already exist, the INVITE to address V may be accepted at step 520. In addition, the INVITE to address V may be accepted at step 520 regardless of the existence of any voice dialogs. Once the INVITE to address V is accepted, a signaling process associated with test/verification processing may be executed in the course of establishing a test/verification session. For example, standard "ringing" signaling may not be provided on Audio Port P, but rather a media session for a verification dialog may be established, as shown by step 522, thus allowing for test/verification signals to be applied at Audio Port P. If a voice dialog does not exist, as determined at step 524, or any existing voice dialogs are on hold, as determined by step 528, the media session established for the verification dialog may exchange bidirectional audio with Audio Port P, at step 526. If one or more voice dialogs are active, as determined by step 530, audio streams may be mixed, as shown by step 532, such that the verification dialog receives audio from Audio Port P and active voice dialogs, and transmits audio to Audio Port P and active voice dialogs.

Figure 6:
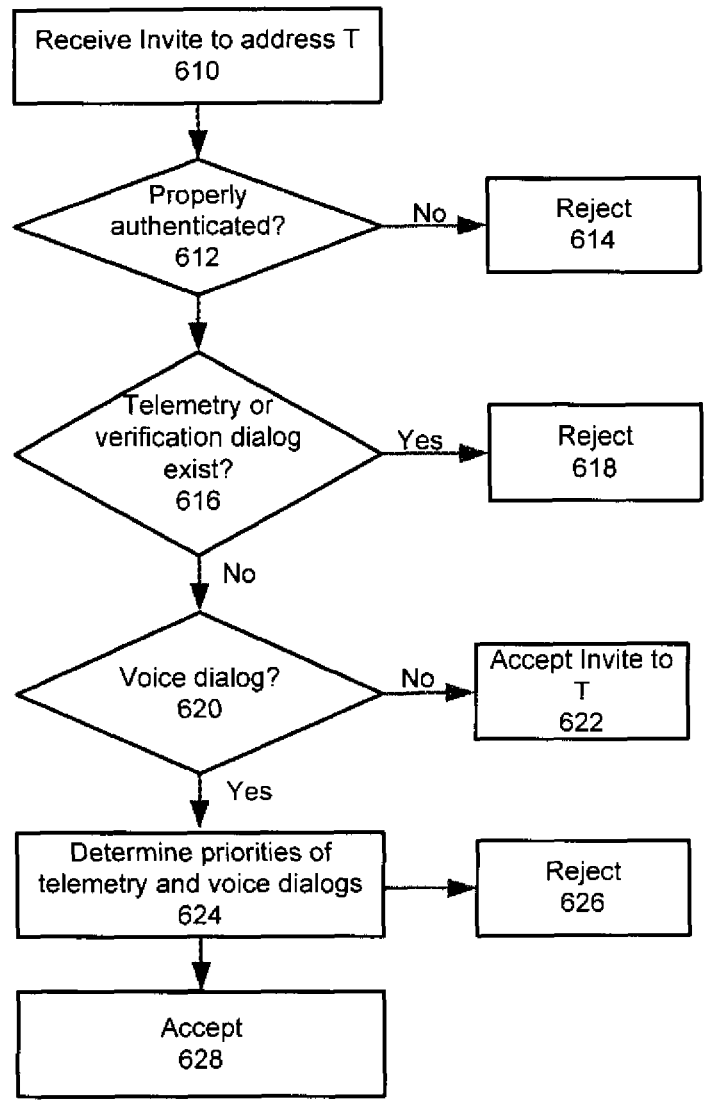
FIG. 6 is an exemplary flowchart illustrating a telemetry process, according to an embodiment of the present invention.

FIG. 6 is an exemplary flowchart illustrating a telemetry process, according to an embodiment of the present invention. At step 610, an INVITE to address T may be received. The INVITE to address T may be transmitted from a remote SIP element and received by a SIP User Agent in a SIP device which, for example, has registered address T as an address at which telemetry sessions with Audio Port P associated with the SIP User Agent may be directed. It may be determined whether the INVITE to address T is properly authenticated, at step 612. If not properly authenticated, the INVITE to address T may be rejected, at step 614. At step 616, it may be determined whether a telemetry or verification dialog already exists. If so, the INVITE to address T may be rejected, at step 618. In addition, other determinations may be made and the INVITE may be rejected for other reasons. It may be determined whether a voice dialog exists, at step 620. If not, the INVITE to address T may be accepted at step 622. If a voice dialog exists, a determination of priorities between the current request and any existing dialogs may be initiated, at step 624. Based on the priorities, the INVITE may be rejected at step 626 or accepted at step 628. If the INVITE to address T is accepted, a signaling process associated with telemetry processing may be executed in the course of establishing a telemetry session. For example, standard "ringing" signaling may not be provided on Audio Port P, but rather specialized electrical signaling may applied at Audio Port P as may be expected by a telemetry device. If a telemetry dialog is established (e.g., the telemetry device responds), an associated media session may exchange bidirectional audio with Audio Port P.

Figure 7:
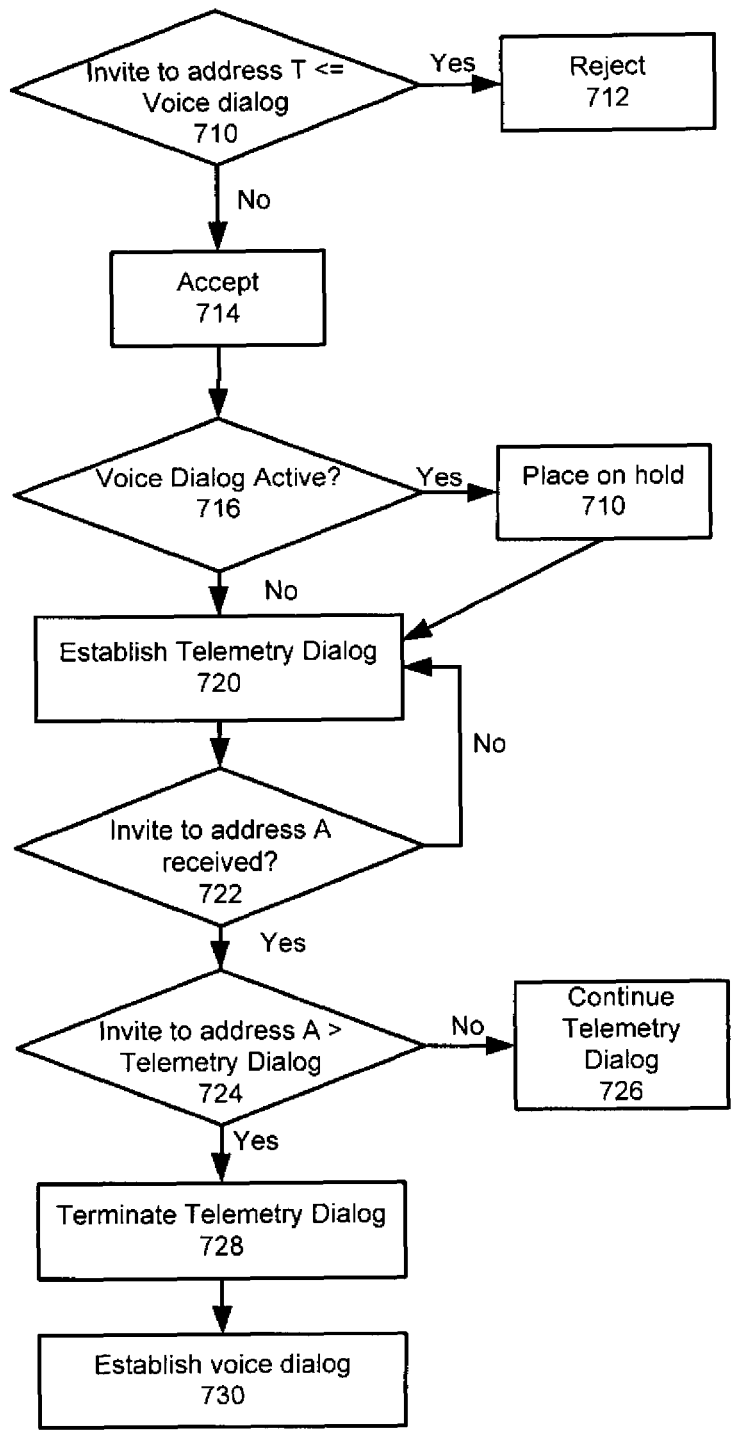
FIG. 7 is an exemplary flowchart illustrating a determination of relative priorities between dialogs, according to an embodiment of the present invention.

FIG. 7 is an exemplary flowchart illustrating a determination of relative priorities between dialogs, according to an embodiment of the present invention. The relative priorities of telemetry and voice dialogs may determine which dialog takes precedence. The priority of a dialog may be specified by a "Priority" field in the header of the INVITE message that establishes the dialog. If a "Priority" field is not present, the priority may default to "normal" or other predetermined default. FIG. 7 illustrates an exemplary determination of priorities between or among dialogs. Other relative priorities may be established.

For example, when an INVITE, to address T is received while one or more voice dialogs exist, a determination of priorities may be made. At step 710, if the priority associated with the INVITE to address T is less than or equal to that of at least one existing voice dialog, the INVITE to address T may be rejected, as shown in step 712. According to an exemplary application, an INVITE to address T may have a lower priority than a voice dialog. However, if the INVITE to address T has a higher priority than existing voice dialogs, the INVITE to address T may be accepted at step 714. If the voice dialog is active, as determined by step 716, the active voice dialog may be placed on hold at step 718 and a telemetry dialog may be established as shown by step 720. At this point, the user may not activate a voice dialog until the telemetry dialog ends. According to another example, an INVITE to address A may be received at step 722 during a time period when a telemetry dialog exists. The corresponding priorities of the requested call session and the existing telemetry session may be similarly compared. If the priority of the INVITE to address A is greater than the priority of the telemetry dialog as shown by step 724, the telemetry dialog may be terminated at step 728 and the voice dialog may be established at step 730. Otherwise, the telemetry dialog may continue as shown by step 726, and the INVITE to address A may be rejected. Other priorities may be implemented in accordance with the various embodiments of the present invention.

While the processes of FIGS. 4, 5, 6 and 7 illustrate certain steps performed in a particular order, it should be understood that the embodiments of the present invention may be practiced by adding one or more steps to the processes, omitting steps within the processes and/or altering the order in which one or more steps are performed.

By recognizing the various distinct contact addresses, User Agent 112 in SIP Device 110 may provide corresponding distinct modes of access to Audio Port P, which may include normal voice calling, verification access, test access, telemetry access and/or other access. According to an embodiment of the present invention, User Agent 112 may provide these functions utilizing standard SIP signaling. As a result, SIP extensions are not required, non-standard protocols are not required, and protocols beyond those used for normal voice calling are not required. According to an exemplary application, standard SIP signaling may be used for providing verification, telemetry access and/or other access.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
receiving, at a network port of a device, an invite message to initiate a communication session with the device;
identifying, by the device, an address associated with the invite message,
the address corresponding to a type of communication session associated with the communication session to be initiated;
determining, by the device, whether an existing communication session is established via an audio port of the device;
determining, by the device and when the existing communication session is established via the audio port, whether the existing communication session is on hold; and
performing, by the device, a session initiation process to establish the communication session via the audio port when the existing communication session is not established via the audio port or when the existing communication session is on hold.

2. The method of claim 1, where the communication session is one of a telemetry communications communication session or a verification communication session.

3. The method of claim 1, where the session initiation process does not provide an alert signal based on the network port of the device receiving the invite message.

4. The method of claim 1, further comprising:
determining whether an audio communication session is established via the audio port.

5. The method of claim 4, further comprising:
exchanging bidirectional audio data during the communication session when the audio communication session is not established via the audio port.

6. The method of claim 4, further comprising:
determining whether the audio communication session is on hold when the audio communication session is established via the audio port.

7. The method of claim 6, further comprising:
determining that the audio communication session is not on hold;
receiving audio data from the audio communication session and the communication session; and
transmitting the audio data to the audio communication session and the communication session.

8. The method of claim 1, where the device comprises a session initiation protocol (SIP) device with a user agent, and the invite message comprises a SIP invite message.

9. The method of claim 1, where the network port comprises a packet switched network interface.

10. A non-transitory computer readable medium storing instructions, the instructions comprising:
one or more instructions that, when executed by one or more processors of a device, cause the one or more processors to:
receive, at a network port of the device, an invite message to initiate a communication session;
identify an address associated with the invite message, the address corresponding to a type of communication session associated with the communication session to be initiated;
determine whether an existing communication session is established via an audio port of the device;
determine, when the existing communication session is established via the audio port, whether the existing communication session is on hold; and
perform a session initiation process to establish the communication session via the audio port when the existing communication session is not established via the audio port or when the existing communication session is on hold.

11. The non-transitory computer readable medium of claim 10, where the instructions further comprise:
one or more instructions that, when executed by the one or more processors, cause the one or more processors to:
determine that no audio communication session is established via the audio port; and
exchange bidirectional audio data during the communication session.

12. The non-transitory computer readable medium of claim 10, where the instructions further comprise:
one or more instructions that, when executed by the one or more processors, cause the one or more processors to:
determine that an audio communication session is established via the audio port; and
determine whether the audio communication session is on hold.

13. A system, comprising:
at least one processor to:
receive an invite message to initiate a communication session,
the invite message being associated with an address that corresponds to a type of communication session associated with the communication session to be initiated;
access an audio port of the system based on the address;
determine whether an existing communication session is established via the audio port;
determine, when the existing communication session is established via the audio port, whether the existing communication session is on hold; and
perform a session initiation process to establish the communication session via the audio port when the existing communication session is not established via the audio port or when the existing communication session is on hold.

14. The system of claim 13, where the communication session is one of a telemetry communication session or a verification communication session.

15. The system of claim 13, where the session initiation process does not provide an alert signal based on the invite message.

16. The system of claim 15, where the alert signal is a ringing signal.

17. The system of claim 13, where the at least one processor is further to:
determine whether an audio communication session is established via the audio port.

18. The system of claim 13, where the at least one processor is further to:
determine that no audio communication session is established via the audio port; and
exchange bidirectional audio data during the communication session.

19. The system of claim 13, where the at least one processor is further to:
determine that an audio communication session is established via the audio port; and
determine whether the audio communication session is on hold.

20. The system of claim 19, where the at least one processor is further to:
determine that the audio communication session is not on hold;
receive audio data from the audio communication session and the communication session; and
transmit the audio data to the audio communication session and the communication session.

21. The system of claim 13, where the invite message comprises a session initiation protocol (SIP) invite message.

\* \* \* \* \*